No. 704,946. Patented July 15, 1902.
L. H. SOHN.
COMBINATION VEHICLE AND STATIONARY SCALE.
(Application filed Apr. 19, 1901.)

(No Model.) 2 Sheets—Sheet 1.

Witnesses:
Geo. W. Young.
M. Rietvelt.

Inventor
Louis H. Sohn.
By Livingston Thompson
Attorneys

THE NORRIS PETERS CO., PHOTO-LITHO., WASHINGTON, D. C.

No. 704,946. Patented July 15, 1902.
L. H. SOHN.
COMBINATION VEHICLE AND STATIONARY SCALE.
(Application filed Apr. 19, 1901.)
(No Model.) 2 Sheets—Sheet 2.

Witnesses:
Geo. W. Young.
M. Rietvelt.

Inventor:
Louis H. Sohn
By Livingston Thompson
Attorney

UNITED STATES PATENT OFFICE.

LOUIS H. SOHN, OF ST. CLOUD, WISCONSIN.

COMBINATION VEHICLE AND STATIONARY SCALE.

SPECIFICATION forming part of Letters Patent No. 704,946, dated July 15, 1902.

Application filed April 19, 1901. Serial No. 56,547. (No model.)

*To all whom it may concern:*

Be it known that I, LOUIS H. SOHN, a citizen of the United States, and a resident of St. Cloud, in the county of Fond du Lac and State of Wisconsin, have invented certain new and useful Improvements in Combination Vehicles and Stationary Scales; and I do hereby declare that the following is a full, clear, and exact description thereof.

My invention has for its object to provide a scale of ordinary construction which is capable of being placed under a vehicle-body for the purpose of registering the load, and also so constructing a device that it may readily be removed from said vehicle running-gear and used as a stationary scale when desired; and it consists in certain peculiarities of construction and combination of parts to be fully set forth hereinafter with reference to the accompanying drawings and subsequently claimed.

Figure 1:
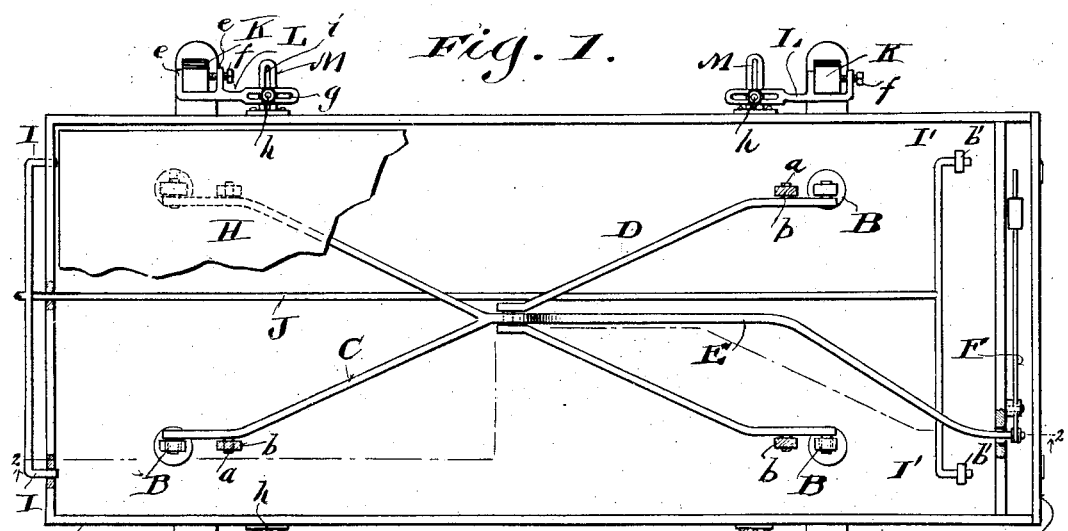
Figure 2:
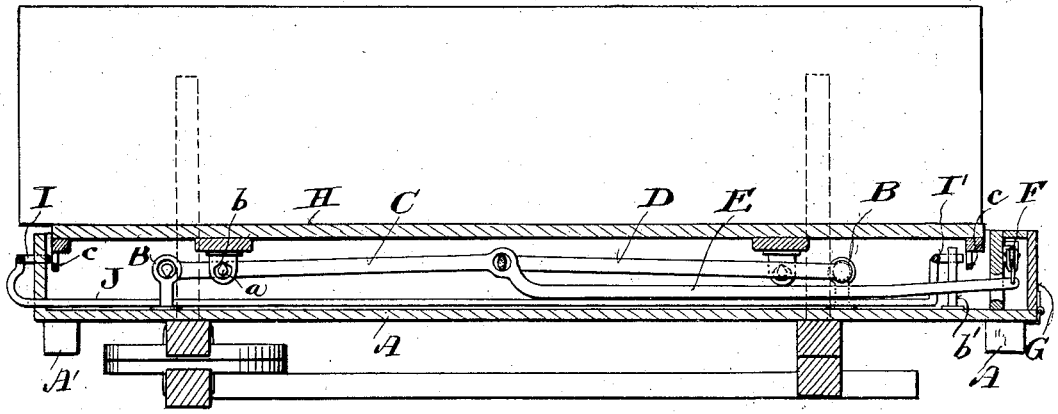
Figure 3:
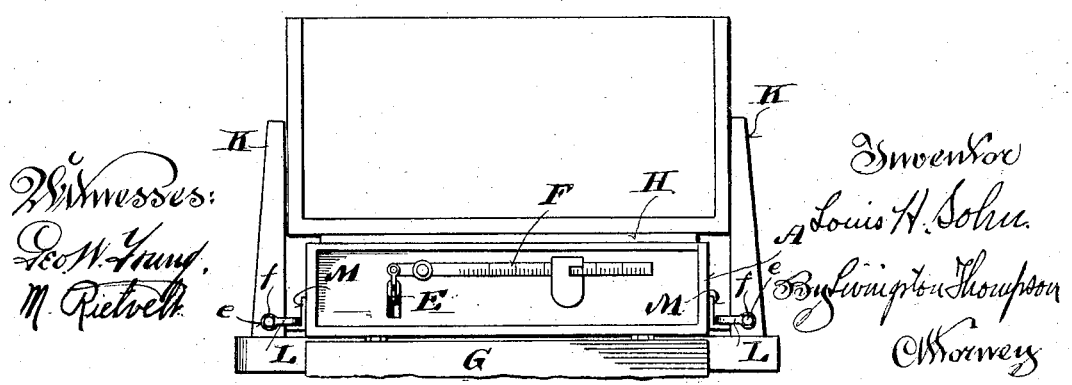
Figure 4:
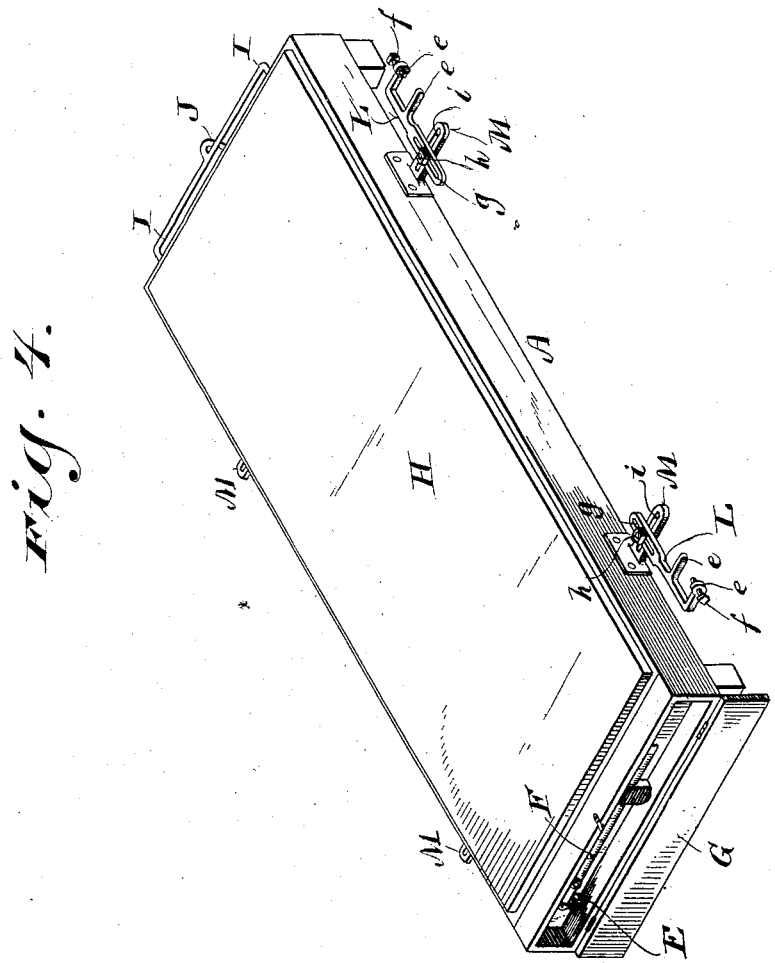

In the drawings, Figure 1 is a plan view of my scale, illustrating it in position and attached to the running-gear of a vehicle. Fig. 2 is a sectional elevation of the same on line 2 2 of Fig. 1, and Fig. 3 is an end view of the latter with the scale-beam-box cover dropped down. Fig. 4 is a perspective view of the scale removed from the vehicle running-gear.

Referring by letters to the drawings, A is a box approximately the size of an ordinary wagon-body and in practice about six inches deep. Said box is provided with bearings B for the ordinary scale-levers C D, the former having an arm E projecting to the rear of the box, where it is connected to an ordinary scale-beam F, which is preferably inclosed in scale-beam box with a hinge-cover G, which will inclose the scale-beam when not in use and prevent tampering with the latter and keep out the dust. A floor H is telescoped into the box A and rests upon four bearing-points $a$ on the scale-levers C D through the stirrups $b$. When the scale is not in use, the floor H is locked in its normal position by means of bolts I I' at the front and rear of the scale-box A. The bolts I pass through apertures in the end of the box A and the bolts I' through the bearings $b'$. The bolts are connected by a rod J, and in order to lock the floor H the rod J is pushed inward, the bolts I and I' passing through loops $c$, projecting from the under side of the floor H, thus making the floor rigid and preventing any motion of the scale. The wagon-body, as shown, rests upon the floor H, and the scale, which is capable of being adjusted to different-sized vehicle running-gears, rests upon the bolsters of the running-gear and is secured to the bolster-stakes K by means of adjustable brackets L. These brackets are provided with arms $e$, which straddle the bolster-stakes, one of which is provided with a set-screw $f$ for securing the latter to the stake. The other end of said bracket is slotted, as at $g$, for the purpose of longitudinal adjustment and is secured to the scale-box by means of a bolt $h$, passing through said slot, and another bracket M, projecting from the side of the scale-box. This bracket is also provided with a slot $i$ at right angles to the slot $g$ in bracket L to permit of adjusting to various widths of the wagon-stakes. By this construction it is obvious that the scale can be readily removed from the running-gear by means of the set-screws $f$.

Having thus described my invention, what I claim as new, and desire to secure by Letters Patent, is—

1. In a combination portable and stationary scale having a rectangular box inclosing the latter, and interposed between the bolsters of a vehicle running-gear and the body therefor, adjustable brackets secured to the sides of said box and means for attaching the brackets to the bolster-stakes, when the scale-box is in position upon the vehicle running-gear, substantially as set forth.

2. In a combination portable and stationary scale having a rectangular box inclosing the latter, and interposed between the bolsters of a vehicle running-gear and the body therefor, a floor for said box upon which the body rests, bolts for locking said floor and box together whereby the former is rigid when the scale is not in use, adjustable brackets secured to the sides of the box, and means for detachably connecting the brackets to the bolster-stakes of a vehicle running-gear when the scale-box is in position upon the bolsters thereof, substantially as set forth.

In testimony that I claim the foregoing I have hereunto set my hand, at Milwaukee, in the county of Milwaukee and State of Wisconsin, in the presence of two witnesses.

LOUIS H. SOHN.

Witnesses:
NIC. LORGE,
MARY LORGE.